Jan. 6, 1931.  R. W. SMYTHE  1,787,877
ADJUSTABLE WEED CUTTER, CULTIVATOR, AND FILLER
Filed June 10, 1929  3 Sheets-Sheet 1
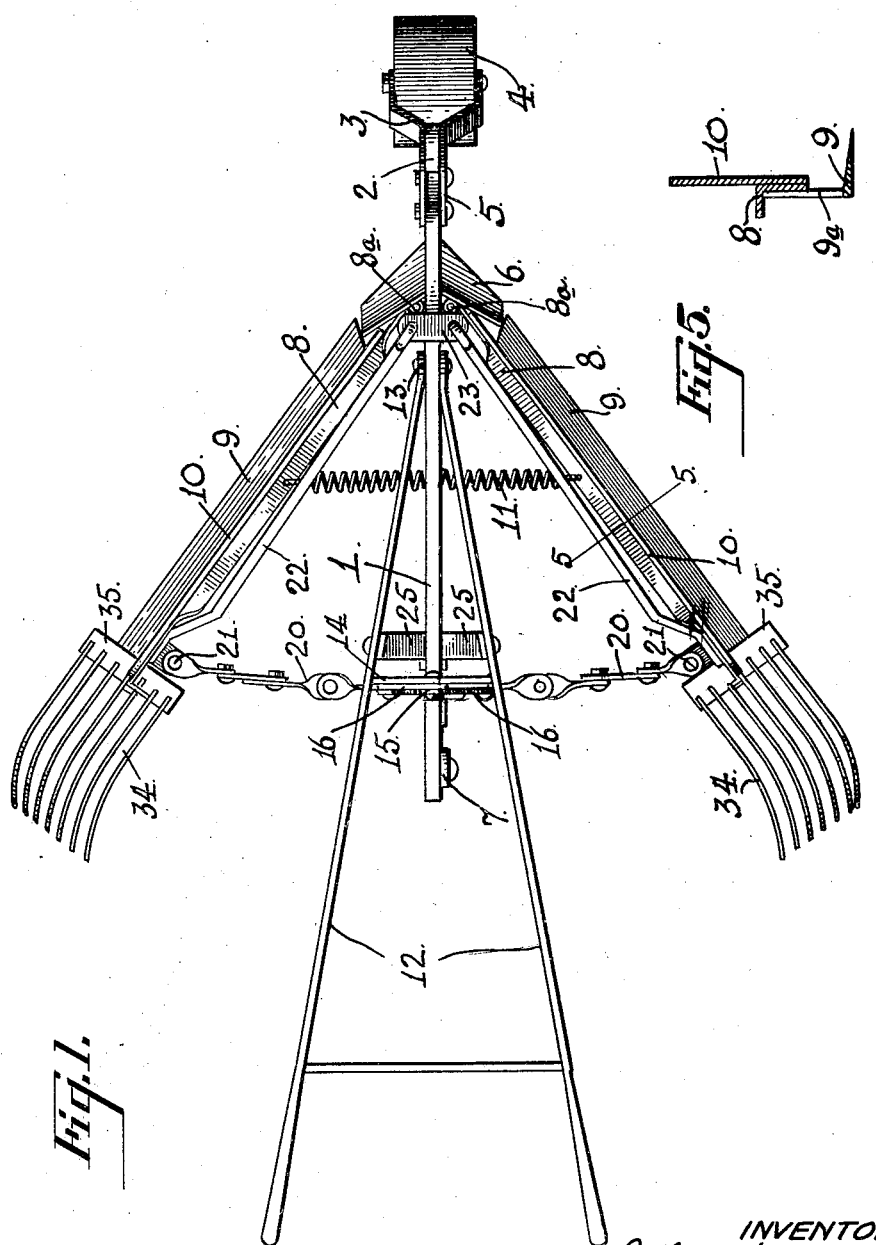

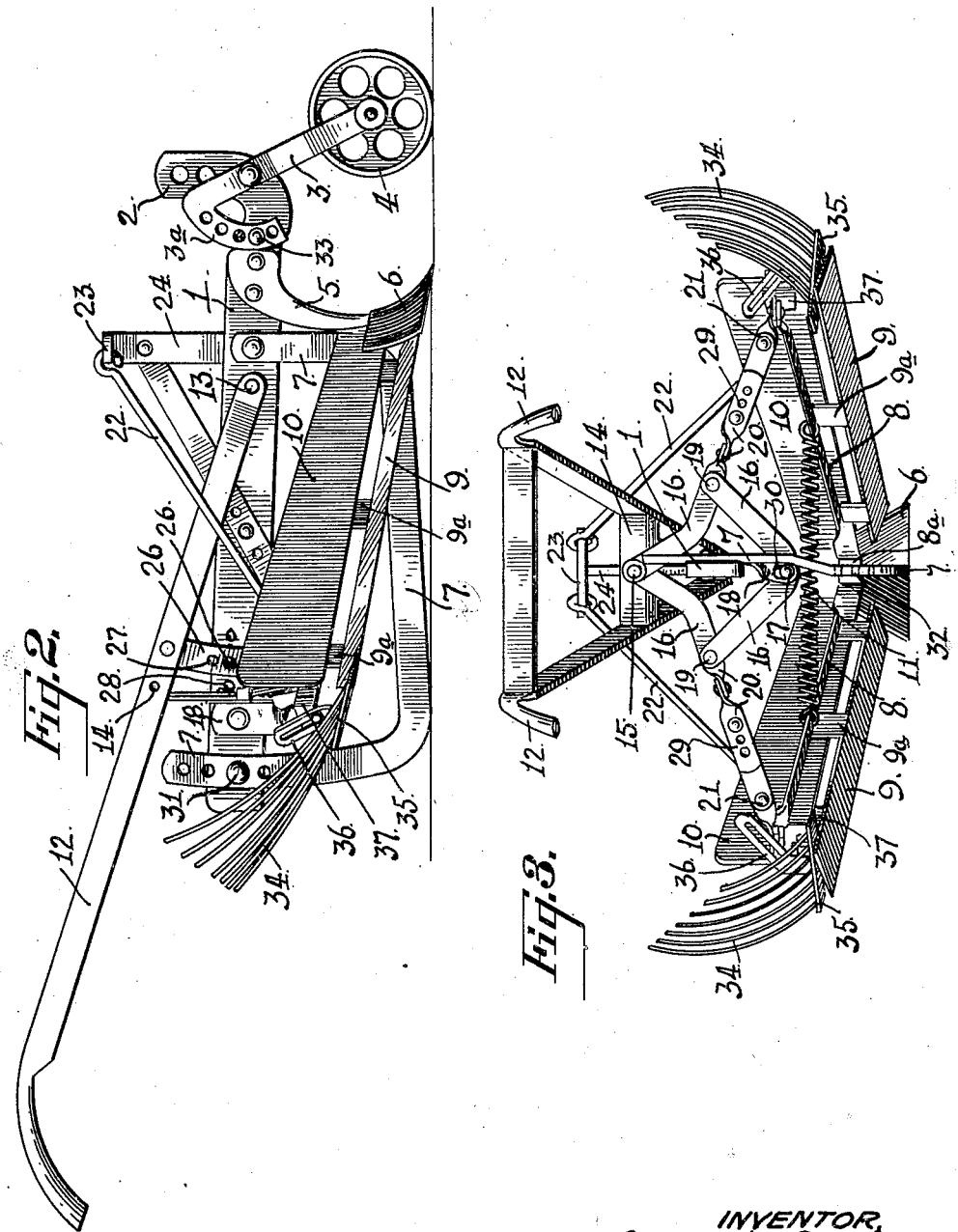

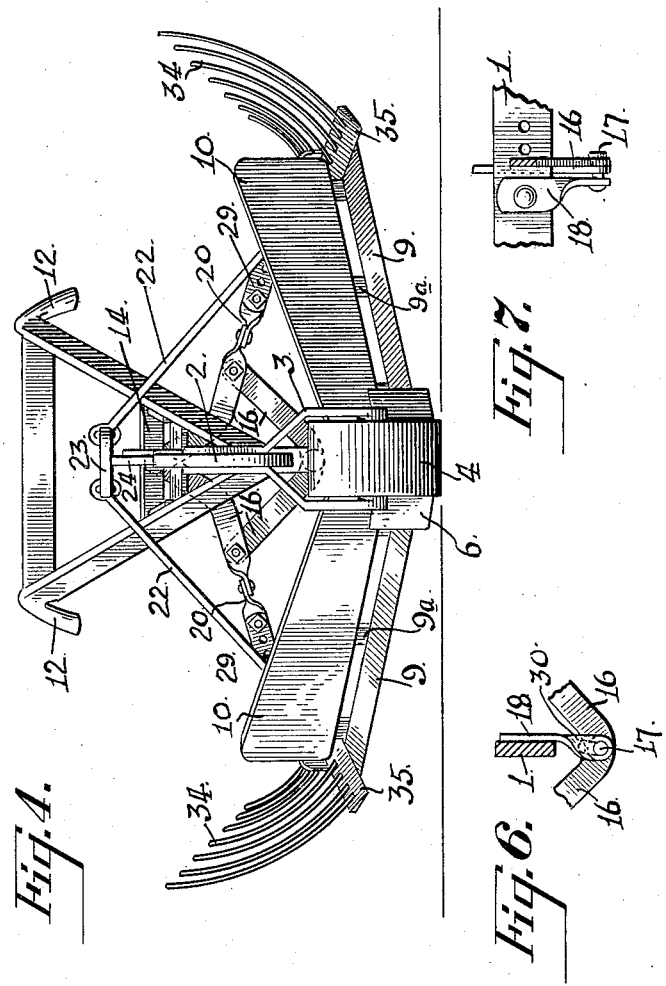

Patented Jan. 6, 1931

1,787,877

UNITED STATES PATENT OFFICE

ROBERT W. SMYTHE, OF KOHALA, TERRITORY OF HAWAII, ASSIGNOR TO KOHALA PINEAPPLE COMPANY, LIMITED, OF MAHUKONA, TERRITORY OF HAWAII, A CORPORATION OF THE TERRITORY OF HAWAII

ADJUSTABLE WEED CUTTER, CULTIVATOR, AND FILLER

Application filed June 10, 1929. Serial No. 369,750.

My invention relates to the general class of cultivators in which the leading function is weed cutting. It is especially adapted for operation in the spaces or furrows between rows of plants, particularly in cases where a relatively careful adjustment of the cutter-blades of the implement is necessary to cover the width of the furrow without injury to the plants. In this connection I have found an implement constructed in accordance with my invention as herein described, quite successful in the cultivation of pineapples.

My invention, therefore, has for its object the provision of an implement which, by reason of its novel structure and its capability of adjustment, is adapted for cultivating, weed cutting and furrow hilling and filling. It consists, in brief, of a frame having a leading earth-penetrating share, followed by a pair of rearwardly diverging weed cutter-blades, which are themselves succeeded by members for turning back into and filling the furrow with the loosened dirt and weeds. There are provisions for adjustment throughout the implement, the principal one being the variation in the angle of divergence of the weed cutter-blades whereby their operative spread may be initially determined in accordance with the contemplated work; and the novel connections whereby the handle of the implement is adapted to effect and to fix, said angle variations.

In the accompanying drawings, I have illustrated my cultivating implement in its preferred form; but it is to be understood that changes may be made in structural details and in arrangement, without departing from the spirit of my invention as defined by the claims hereunto appended.

In the drawings—Fig. 1 is a top plan view of the implement.

Fig. 2 is a side elevation.

Fig. 3 is a rear view.

Fig. 4 is a front view.

Fig. 5 is a sectional detail on the line 5—5 of Fig. 1.

Figs. 6 and 7 are fragmentary details of the connection of the toggle system with the beam.

1 is the beam of the implement, the forward end 2 of which is designed for the usual clevis or draft connection; and said end carries a fork 3 in which is mounted the front wheel 4. To said beam is also secured the standard 5 of the double-shared, earth penetrating cultivator plow 6.

Depending from the beam in the vertical plane thereof is the depth-regulating runner 7 (see Fig. 2), to the forward end of which, as shown in Figs. 1 and 3 are hinged at 8a for lateral movement about a vertical axis, the rearwardly diverging, cutter-carrying bars 8, to which are secured by the hangers 9a, the cutter-blades 9 and the guard plates 10 above said blades. A spring 11 connects and normally tends to draw towards each other the two bars 8.

12 is the handle of the implement. Its forward end is pivotally connected at 13 to the beam 1 adapting it for independent movement in a vertical plane. To a cross bar 14 of the handle are pivoted by their upper ends at 15, a pair of toggles 16, the lower ends of which are pivoted at 17 to a bracket 18 depending from the frame beam 1. These are best seen in Fig. 3. To the angle of the toggles 16 are pivoted at 19 by one end a second pair of toggles 20, the other ends of which are pivoted at 21 to the bars 8. From these last named pivotal connections extend a pair of guy-rods 22, the other ends of which are linked to a cross head 23 of a standard 24 rising from the beam 1, Fig. 2.

These several connections between the handle and the spring controlled cutter-carrying bars 8 provide for the spreading adjustment of the cutter blades 9 by moving the handle about its pivot 13. Therefore, the weed-cutting blades can readily be adjusted with respect to their spread, according to the width of the space or furrow between the plant rows.

In order to provide for further necessary adjustments in accordance with the requirements of the work, the following constructions will be noted.

The initial adjustment of the cutter blades 9 with regard to their spread is fixed for the given work, by means of the quadrant 25 secured to the handle 12 and which is adapted to be connected adjustably with the beam 1 by a pin 26 passing through any of the registering holes 27 and 28 in the quadrant and beam, respectively. See Fig. 2. A change may be had in the range of spreading movement of the blades 9 by making the toggles 20 in sections adjustable as indicated in Fig. 3 by the holes 29. Also a change in the angle of the toggle 16 may be had by a pin and slot connection between the lower ends of said toggles and the bracket 18, as shown at 30, Figs. 3, 6 and 7. The depth-regulating runner 7 may be adjusted by a change in the pin and hole connection 31 between its rear end and the beam 1, Fig. 2. An angular vertical adjustment of the cutter-blade assembly may be made by varying the pin and hole connection at 32 between the forward ends of the bars 8 and the runner 7, Fig. 3.

The front wheel 4 can be adjusted by means of the pin and hole connection 33 between the quadrant 3a of the fork 3 and the front end of the beam 1, Fig. 2.

The cultivator plow 6 may be adjusted to its proper relation with the cutter blades 9 by moving the standard 5 of said plow about its connection with the beam.

It will be noted that the guard plates 10 are preferably widened gradually towards the rear, and that the cutter blades 9 are spaced from said plates, thereby enabling some of the dirt to sift through toward the inside and prevent clogging. There are also furrow filling members. They comprise a wire comb 34, a cross head 35 and a shank 36, which is connected adjustably with a bracket 37 secured to the rear ends of the bars 8, Figs. 2 and 3. Their position, and the angles at which the combs 34 lie, is such that they receive the dirt and weeds from the cutter blade assembly, sift out some of the dirt into the sides of the furrow, and turn the rest of the dirt and the weeds into the middle of the furrow, thereby filling up or substantially leveling the space between rows of plants.

In operation, the implement is initially adjusted according to the work ahead, that is to say, the general condition of the spaces between the plant rows is considered; the width of the furrows in respect to their substantial uniformity or average is noticed; and such other matters taken into account as are within the skill and experience of the operator. The various adjustments are then made, the outstanding one of which may be said to be the spread and fixing of the cutter-blade assembly; the others being apparent and in need of no further description than that hereinabove given.

The leading earth penetration is made by the plow 6, and as the implement advances the weeds are cut throughout the furrow width and close up to the plants, and the earth is turned up with them. The general mass or bulk of the material thus affected is guided rearwardly and outwardly by the guard plates 10 and delivered to the fillers, the angular combs 34 of which partially separate the dirt and weeds and direct them inwardly to the furrow, thus tending to fill or level it.

It will be noted that the guard plates 10 serve also the highly important function of hillers. Ordinarily cultivators break down the sides of the furrow and these have to be put back by some kind of a hiller. But with the plates 10 pressing the dirt outwardly, the furrow is hilled at the same time that cultivation proceeds. If no hilling is desired, the plates 10 may be detached, and a certain amount of soil returned into the furrow.

I claim:—

1. A cultivating implement comprising a frame; a leading earth-penetrating share carried by the frame; rearwardly divergent weed-cutter blades carried by the frame at each side, back of the share; and angularly disposed furrow filling means associated with the rear ends of the cutter blades adapted to receive the loosened material and return it to the furrow.

2. A cultivating implement comprising a frame; a leading earth-penetrating share carried by the frame; rearwardly divergent bars carried by the frame at each side, back of the share; weed-cutter blades carried by said bars; means for varying the angle of divergence of said bars and cutter blades; and angularly disposed furrow filling means carried by said bars in association with the rear ends of the cutter blades adapted to receive the loosened material and return it to the furrow.

3. In a cultivating implement, the combination of a beam; a leading earth penetrating share; a pair of rearwardly diverging bars; weed cutter blades carried by said bars; guard plates carried by the bars above and spaced from the blades adapted to hill up the furrow walls; and angularly disposed comb-like members associated with the rear ends of the cutter blades for receiving the loosened material and returning it to the furrow.

4. A cultivating implement comprising a beam; a leading earth penetrating double faced share carried by the beam; a depth runner carried by the beam; a pair of rearwardly diverging bars secured in front to said depth runner; weed cutter blades carried by said bars; guard plates carried by the bars above and spaced from the blades for hilling up the furrow walls; and connections for supporting the rear ends of said bars.

5. A cultivating implement comprising a beam; a leading earth penetrating double faced share carried by the beam; a depth runner carried by the beam; a pair of rearwardly diverging bars secured in front to said depth runner; weed cutter blades carried by said bars; guard plates carried by the bars above and spaced from the blades for hilling up the furrow walls; connections for supporting the rear ends of said bars; and comb-like members angulary secured to the rear ends of said bars in position to receive the loosened material and turn it inwardly into the furrow.

6. A cultivating implement comprising a beam; a leading earth penetrating double faced share carried by the beam; a depth runner carried by said beam; a pair of rearwardly diverging bars hinged at their front ends to said depth runner adapting them for lateral movement to adjust their angle of divergence; means for flexibly supporting the rear ends of said bars; weed cutter blades carried by said bars; guard plates carried by the bars above and spaced from the blades for hilling up the furrow walls; and comb-like members angularly secured to the rear ends of said bars in position to receive the loosened material and turn it inwardly into the furrow.

In testimony whereof I have signed my name to this specification.

ROBERT W. SMYTHE.